US012290942B2

United States Patent
Toshimitsu

(10) Patent No.: US 12,290,942 B2
(45) Date of Patent: *May 6, 2025

(54) METHOD FOR CONTROLLING ROBOT, ROBOT SYSTEM, AND STORAGE MEDIUM

(71) Applicant: Seiko Epson Corporation, Tokyo (JP)

(72) Inventor: Shunsuke Toshimitsu, Azumino (JP)

(73) Assignee: SEIKO EPSON CORPORATION (JP)

( * ) Notice: Subject to any disclaimer, the term of this patent is extended or adjusted under 35 U.S.C. 154(b) by 140 days.

This patent is subject to a terminal disclaimer.

(21) Appl. No.: 17/708,335

(22) Filed: Mar. 30, 2022

(65) Prior Publication Data

US 2022/0314451 A1     Oct. 6, 2022

(30) Foreign Application Priority Data

Mar. 31, 2021     (JP) ................. 2021-062362

(51) Int. Cl.
*B25J 9/16*     (2006.01)
*B25J 9/04*     (2006.01)
*B25J 9/12*     (2006.01)

(52) U.S. Cl.
CPC .................... *B25J 9/1692* (2013.01)

(58) Field of Classification Search
CPC ...... B25J 9/1692; B25J 9/1633; B25J 9/1602; B25J 9/042; B25J 9/126; B25J 9/1664; B25J 9/00; B25J 9/16; B25J 9/1656; B25J 11/005; B25J 11/0075; G05B 2219/39195
See application file for complete search history.

(56) References Cited

U.S. PATENT DOCUMENTS

| | | |
|---|---|---|
| 2001/0033146 A1 | 10/2001 | Kato et al. |
| 2011/0093120 A1 | 4/2011 | Ando et al. |
| 2012/0065902 A1* | 3/2012 | Nakajima ............... B25J 13/085 702/56 |
| 2012/0179294 A1* | 7/2012 | Sasai ...................... B25J 9/1694 700/254 |
| 2015/0290804 A1* | 10/2015 | Wada ...................... B25J 9/1641 901/42 |
| 2016/0329837 A1* | 11/2016 | Kataoka ............... A61B 5/0263 |

(Continued)

FOREIGN PATENT DOCUMENTS

| | | |
|---|---|---|
| CN | 112140127 A | 12/2020 |
| JP | H06-278080 A | 10/1994 |

(Continued)

*Primary Examiner* — Adam R Mott
*Assistant Examiner* — Byron Xavier Kasper
(74) *Attorney, Agent, or Firm* — Harness, Dickey & Pierce, P.L.C.

(57) ABSTRACT

Provided is a method for controlling a robot including a base, a robot arm coupled to the base, and a drive unit including a motor for driving the robot arm. The method includes a first step of acquiring weight information including information on a weight of an end effector installed on the robot arm and a weight of an object to be worked by the end effector; a second step of determining a frequency component to be removed from a drive signal for driving the motor based on the weight information acquired in the first step; and a third step of removing the frequency component determined in the second step from the drive signal to generate a correction drive signal.

8 Claims, 10 Drawing Sheets

(56) References Cited

U.S. PATENT DOCUMENTS

| | | | |
|---|---|---|---|
| 2018/0281184 A1 | 10/2018 | Kudo | |
| 2019/0329415 A1 | 10/2019 | Takeuchi | |
| 2020/0023515 A1 | 1/2020 | Hirabayashi | |
| 2020/0130961 A1* | 4/2020 | Diankov | B25J 9/1687 |
| 2020/0283242 A1* | 9/2020 | Osaka | B25J 9/1633 |
| 2020/0306961 A1 | 10/2020 | Hiraide et al. | |
| 2020/0406458 A1 | 12/2020 | Seki et al. | |
| 2021/0060784 A1 | 3/2021 | Kinugasa et al. | |
| 2022/0111521 A1 | 4/2022 | Binnard et al. | |

FOREIGN PATENT DOCUMENTS

| | | | |
|---|---|---|---|
| JP | 2001-293638 A | | 10/2001 |
| JP | 2016221661 A | * | 12/2016 |
| JP | 2020-015153 A | | 1/2020 |
| JP | 2020-157402 A | | 10/2020 |

* cited by examiner

FIG. 4

| HEIGHT INFORMATION | FREQUENCY COMPONENT |
|---|---|
| C1 | F1 |
| C2 | F2 |
| C3 | F3 |
| C4 | F4 |
| ⋮ | ⋮ |

WEIGHT INFORMATION W1

| HEIGHT INFORMATION | FREQUENCY COMPONENT |
|---|---|
| C1 | F1 |
| C2 | F2 |
| C3 | F3 |
| C4 | F4 |
| ⋮ | ⋮ |

T1

WEIGHT INFORMATION W2

| HEIGHT INFORMATION | FREQUENCY COMPONENT |
|---|---|
| C1' | F1' |
| C2' | F2' |
| C3' | F3' |
| C4' | F4' |
| ⋮ | ⋮ |

POSITIONAL RELATIONSHIP A1 — T1

| HEIGHT INFORMATION | FREQUENCY COMPONENT |
|---|---|
| C1 | F1 |
| C2 | F2 |
| C3 | F3 |
| C4 | F4 |
| ⋮ | ⋮ |

POSITIONAL RELATIONSHIP A2 — T1

| HEIGHT INFORMATION | FREQUENCY COMPONENT |
|---|---|
| C1' | F1' |
| C2' | F2' |
| C3' | F3' |
| C4' | F4' |
| ⋮ | ⋮ |

SHAPE B1 — T1

| HEIGHT INFORMATION | FREQUENCY COMPONENT |
|---|---|
| C1 | F1 |
| C2 | F2 |
| C3 | F3 |
| C4 | F4 |
| ⋮ | ⋮ |

SHAPE B2 — T1

| HEIGHT INFORMATION | FREQUENCY COMPONENT |
|---|---|
| C1' | F1' |
| C2' | F2' |
| C3' | F3' |
| C4' | F4' |
| ⋮ | ⋮ |

. . . .

POSITIONAL RELATIONSHIP A1 (HEIGHT C1)

POSITIONAL RELATIONSHIP A2 (HEIGHT C2)

SHAPE B1

SHAPE B2

METHOD FOR CONTROLLING ROBOT, ROBOT SYSTEM, AND STORAGE MEDIUM

The present application is based on, and claims priority from JP Application Serial Number 2021-062362, filed Mar. 31, 2021, the disclosure of which is hereby incorporated by reference herein in its entirety.

BACKGROUND

1. Technical Field

The present disclosure relates to a method for controlling a robot, a robot system, and a non-transitory computer-readable storage medium storing a program for controlling a robot.

2. Related Art

In recent years, automation of work that has been done manually is accelerating by various robots and robot peripheral devices due to an increase in labor costs and lack of talents in a factory. As the various robots, for example, a robot as disclosed in JP-A-2001-293638 is known.

The robot of JP-A-2001-293638 performs the following operations in order to reduce a vibration of an arm. First, the vibration is measured by tapping and vibrating an end effector provided on the arm. Next, a natural frequency of the arm is calculated based on a measurement result. Then, based on the calculated natural frequency, a specific frequency component is removed from a torque control signal for operating the arm to correct the torque control signal.

By driving the arm with a corrected torque control signal, the vibration generated in the arm can be reduced.

However, in the robot of JP-A-2001-293638, it is necessary to tap by a hammer and to prepare a measuring device for measuring the vibration in order to specify the natural frequency, which is troublesome.

SUMMARY

A method for controlling a robot according to the present disclosure is a method for controlling a robot including a base, a robot arm coupled to the base, and a drive unit including a motor for driving the robot arm. The method includes: a first step of acquiring height information on a height of a tip end of the robot arm during an operation of the robot arm or during a stop of the robot arm; a second step of determining a frequency component to be removed from a drive signal for driving the motor based on the height information acquired in the first step; and a third step of removing the frequency component determined in the second step from the drive signal to generate a correction drive signal.

A robot system according to the present disclosure includes: a base; a robot arm coupled to the base; a drive unit including a motor for driving the robot arm; and a control unit configured to control an actuation of the robot arm. The control unit includes: an acquisition unit configured to acquire height information on a height of a tip end of the robot arm during an operation of the robot arm or during a stop of the robot arm, and a correction signal generation unit configured to determine a frequency component to be removed from a drive signal based on the height information acquired by the acquisition unit and to remove the determined frequency component from the drive signal to generate a correction drive signal.

A non-transitory computer-readable storage medium according to the present disclosure stores a program for controlling a robot including a base, a robot arm coupled to the base, and a drive unit including a motor for driving the robot arm. The program is configured to cause the robot to execute: a first step of acquiring height information on a height of a tip end of the robot arm during an operation of the robot arm or during a stop of the robot arm; a second step of determining a frequency component to be removed from a drive signal for driving the motor based on the height information acquired in the first step; and a third step of removing the frequency component determined in the second step from the drive signal to generate a correction drive signal.

BRIEF DESCRIPTION OF THE DRAWINGS

FIG. 4 is a diagram showing an example of a table referred to by an adjustment unit.

FIG. 5 is a diagram showing an example of tables referred to by the adjustment unit.

FIG. 6 is a diagram showing an example of tables referred to by the adjustment unit.

FIG. 7 is a diagram showing an example of tables referred to by the adjustment unit.

DESCRIPTION OF EXEMPLARY EMBODIMENTS

Hereinafter, a method for controlling a robot, a robot system, and a non-transitory computer-readable storage medium storing a program for controlling a robot according to the present disclosure will be described in detail based on a preferred embodiment shown in the accompanying drawings.

First Embodiment

Figure 1:
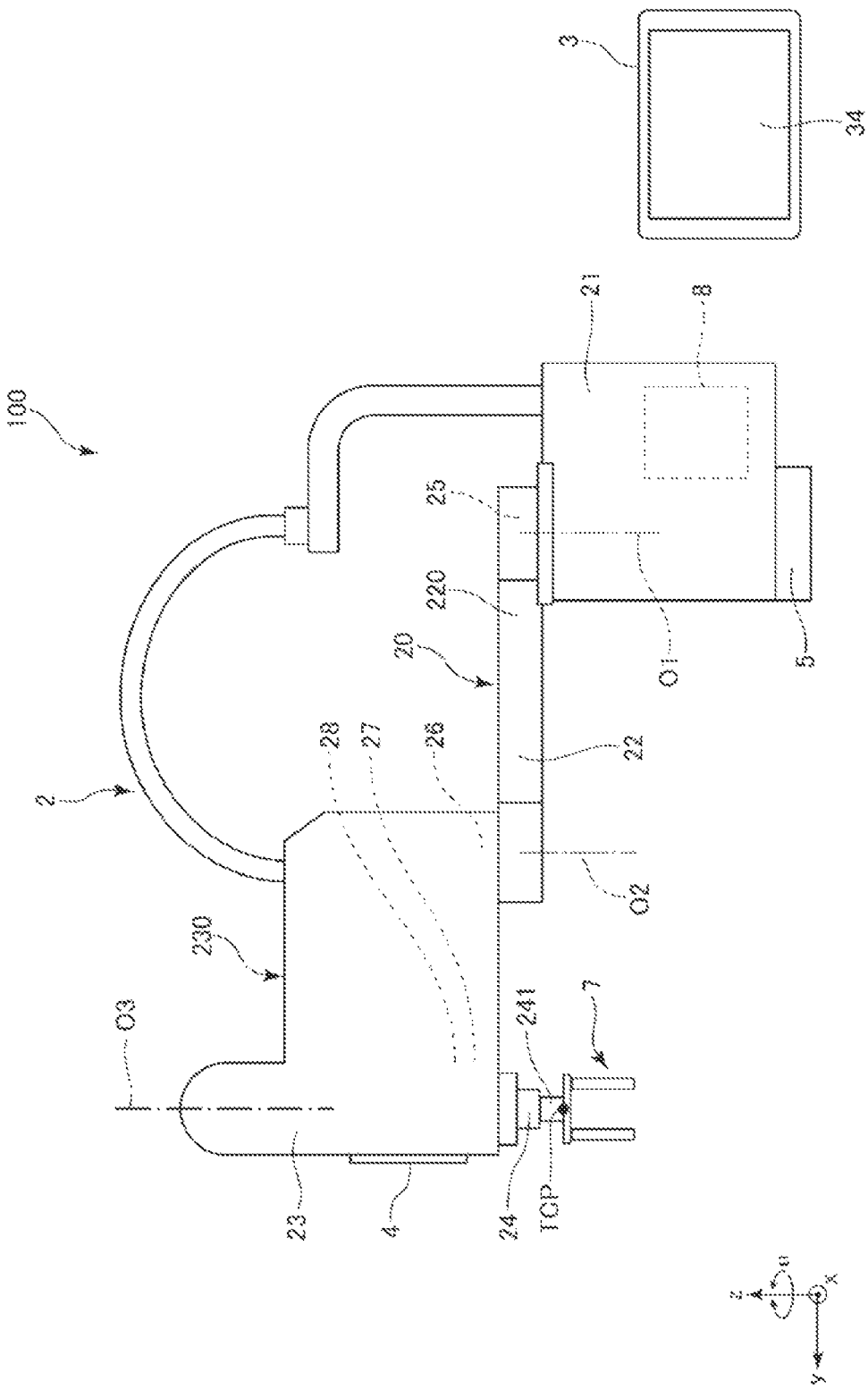
FIG. 1 is a schematic configuration diagram of a robot system according to the present disclosure.
Figure 2:
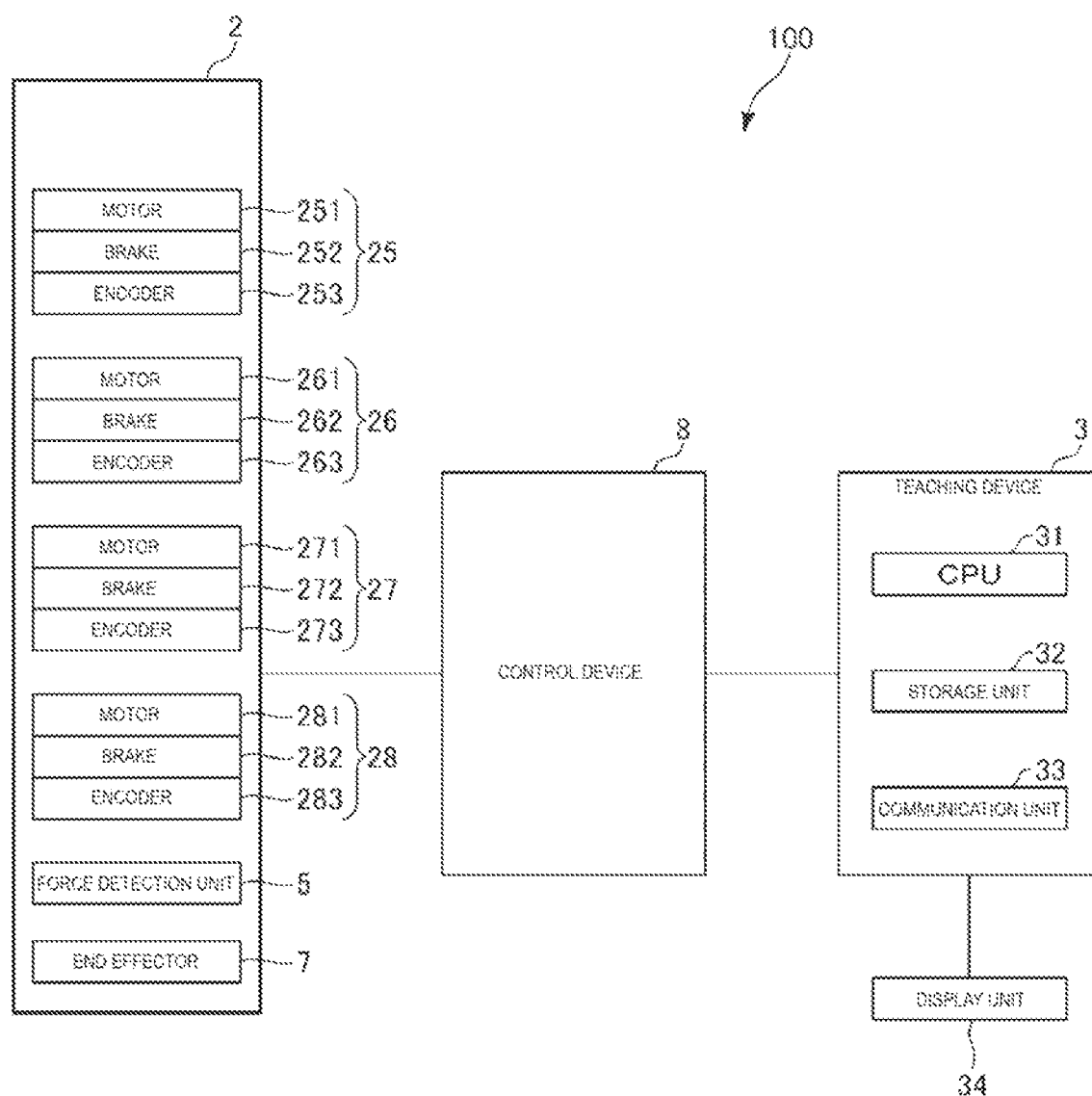
FIG. 2 is a block diagram of the robot system shown in FIG. 1.
Figure 3:
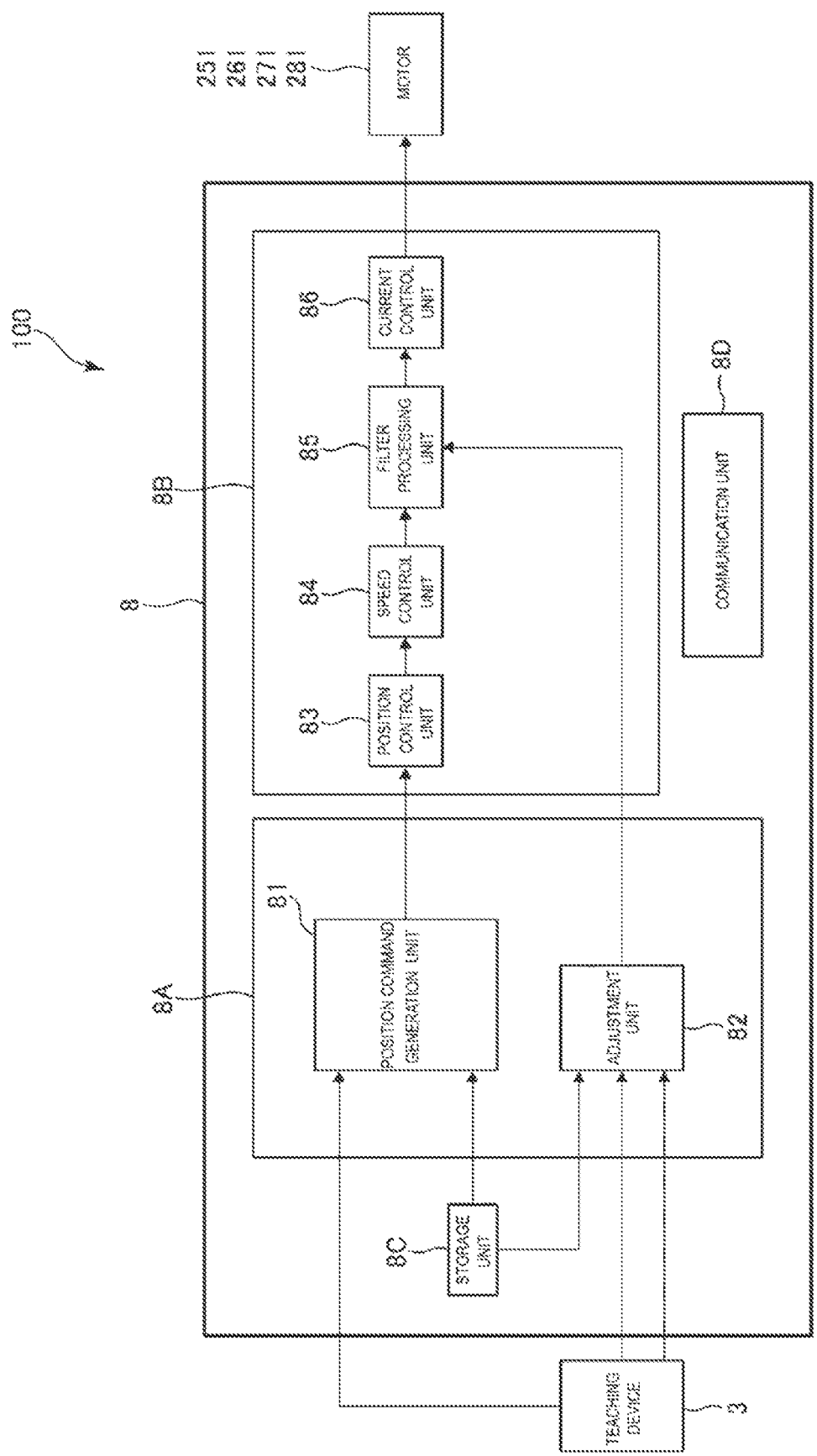
FIG. 3 is a block diagram of a control device shown in FIG. 1.
Figure 8:
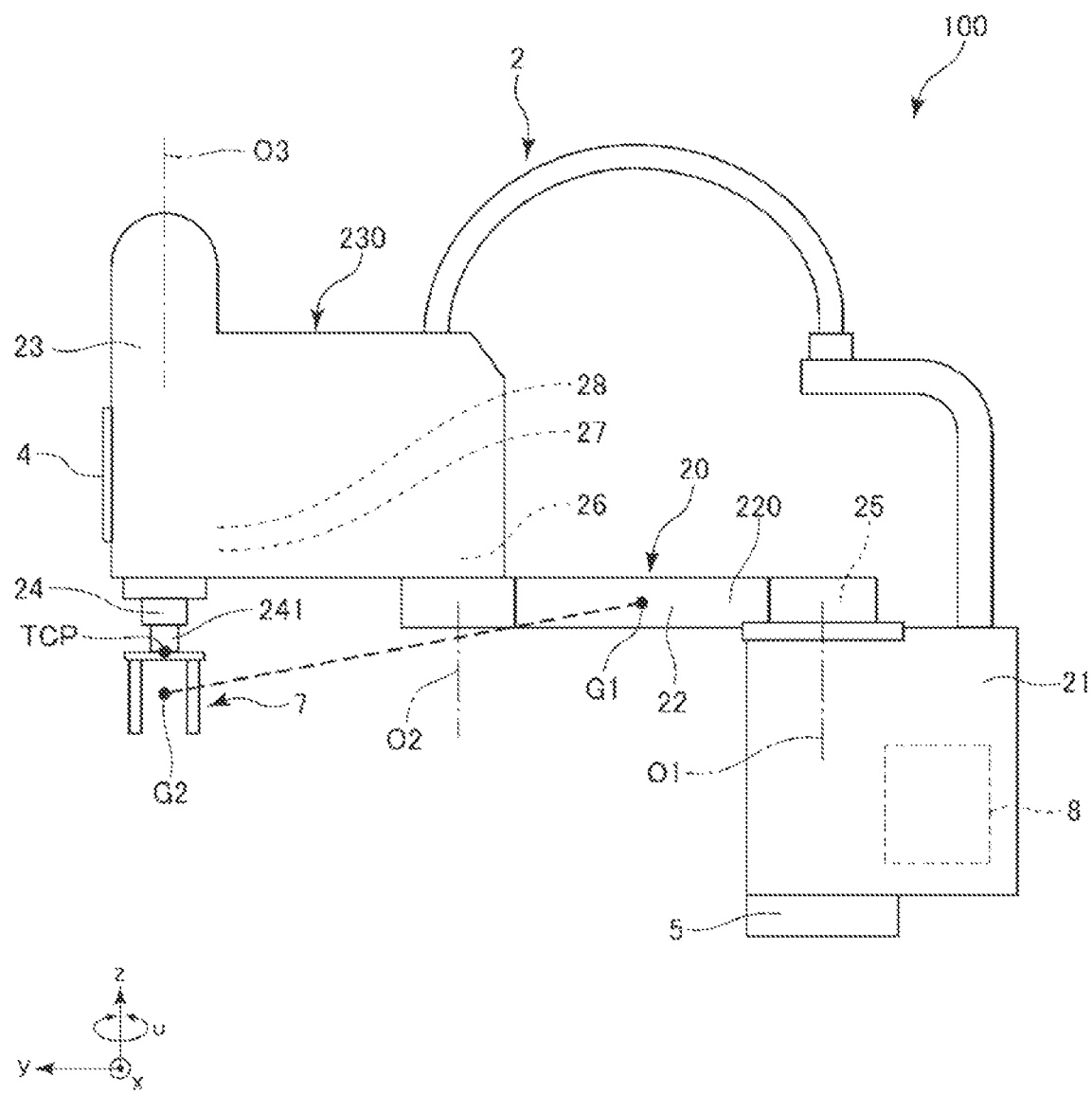
FIG. 8 is a side view showing a positional relationship between a gravity center of a robot arm and a gravity center of an end effector of a robot shown in FIG. 1.
Figure 9:
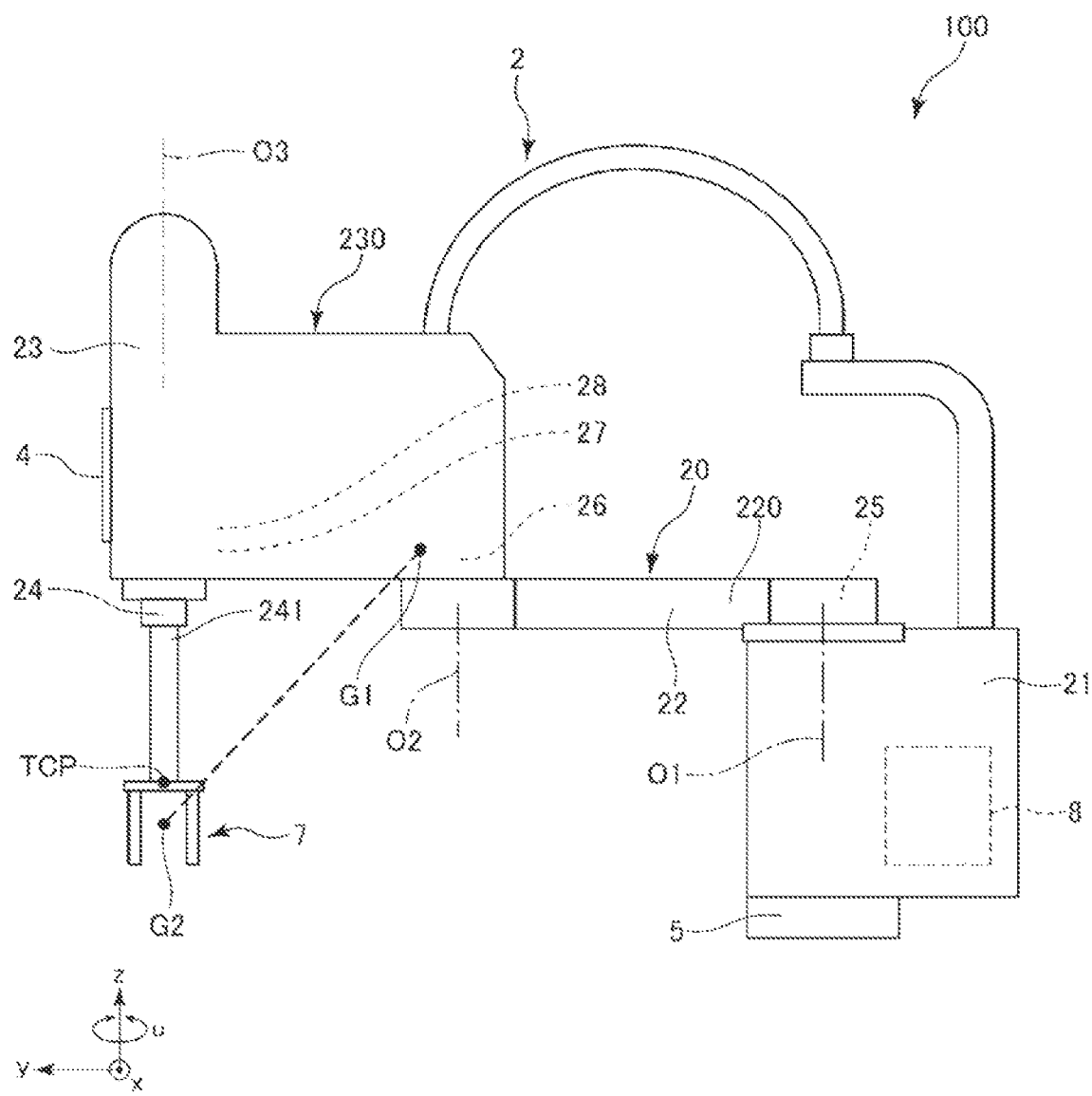
FIG. 9 is a side view showing a positional relationship between the gravity center of the robot arm and the gravity center of the end effector of the robot shown in FIG. 1.
Figure 10:
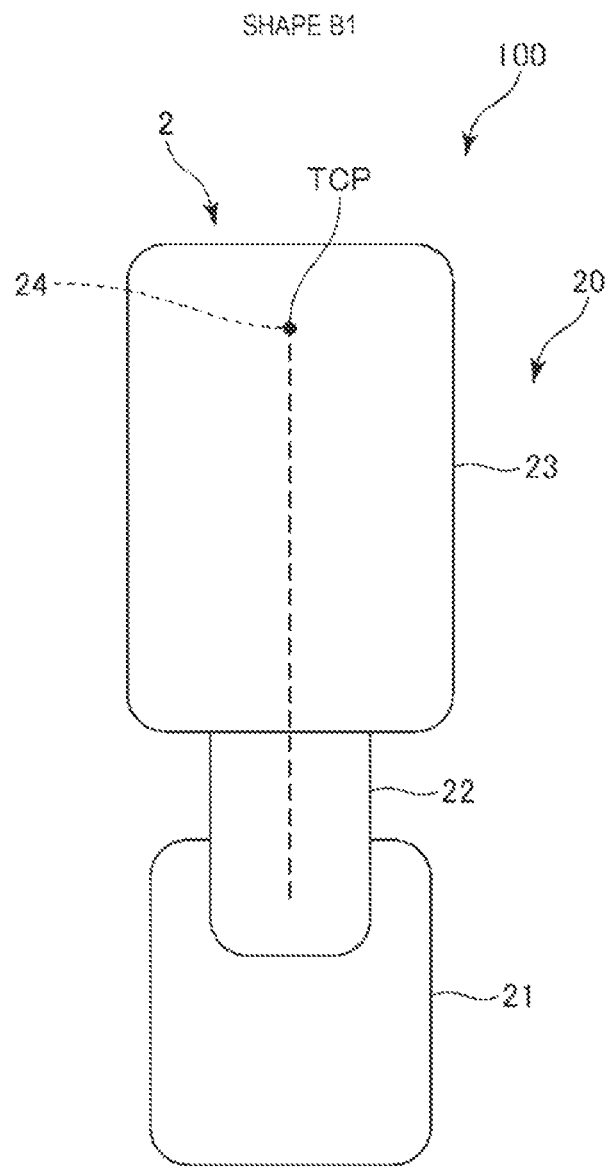
FIG. 10 is a diagram showing an overall shape of the robot arm shown in FIG. 1.
Figure 11:
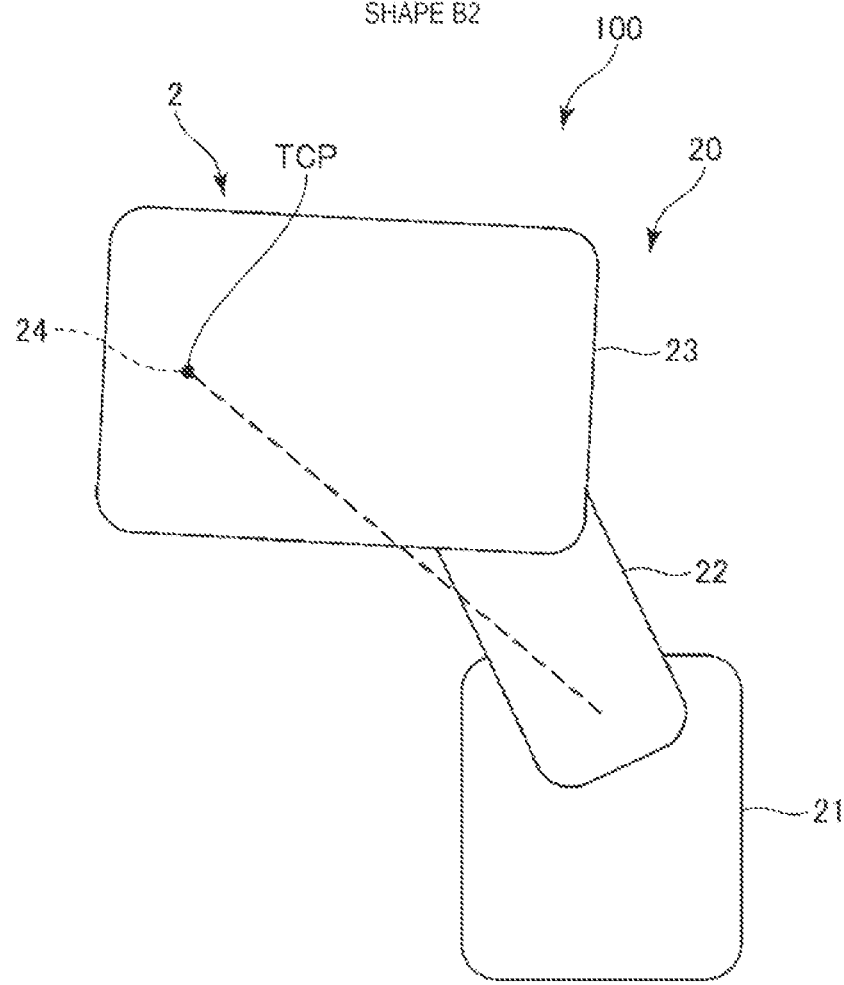
FIG. 11 is a diagram showing the overall shape of the robot arm shown in FIG. 1.
Figure 12:
FIG. 12 is a diagram illustrating an operation path of the robot arm shown in FIG. 1.
Figure 13:
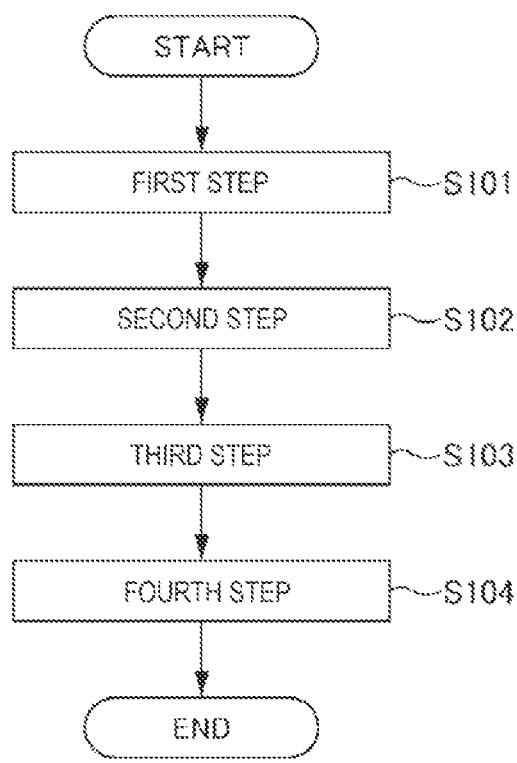
FIG. 13 is a flowchart illustrating a method for controlling a robot according to the present disclosure.

FIG. 1 is a schematic configuration diagram of the robot system according to the present disclosure. FIG. 2 is a block diagram of the robot system shown in FIG. 1. FIG. 3 is a block diagram of a control device shown in FIG. 1. FIGS. 4 to 7 are diagrams showing examples of tables referred to by an adjustment unit. FIGS. 8 and 9 are side views showing positional relationships between a gravity center of a robot arm of a robot and a gravity center of an end effector shown in FIG. 1. FIGS. 10 and 11 are diagrams showing overall shapes of the robot arm shown in FIG. 1. FIG. 12 is a diagram illustrating an operation path of the robot arm shown in FIG. 1. FIG. 13 is a flowchart illustrating the method for controlling a robot according to the present disclosure.

In FIG. 1, for convenience of description, an x axis, a y axis, and a z axis are illustrated as three axes orthogonal to each other. Hereinafter, a direction parallel to the x axis is also referred to as an "x-axis direction", a direction parallel to the y axis is also referred to as a "y-axis direction", and a direction parallel to the z axis is also referred to as a "z-axis direction". The z-axis direction in FIG. 1, that is, an upper-lower direction is referred to as a "vertical direction", and the x-axis direction and the y-axis direction, that is, a left-right direction is referred to as a "horizontal direction". In each axis, a tip end side is referred to as a "+side", and a base end side is referred to as a "−side".

A robot system 100 shown in FIGS. 1 and 2 is a device used, for example, in operations for holding, conveying, assembling, inspecting, and the like of an object (hereinafter referred to as a "workpiece") to be worked by an electronic component and an electronic device. The robot system 100 includes a robot 2, a control device 8 that controls an actuation of the robot 2, a teaching device 3 that teaches the robot 2 an operation program, a force detection unit 5, and an end effector 7. The robot 2, the control device 8, and the teaching device 3 can communicate with each other in a wired or wireless manner, and the communication may be performed via a network such as the Internet.

First, the robot 2 will be described.

In the illustrated configuration, the robot 2 is a horizontal articulated robot, that is, a SCARA robot. However, the robot 2 is not limited to the configuration, and may be an articulated robot such as a vertical six-axis robot. As shown in FIG. 1, the robot 2 includes a base 21, a robot arm 20 coupled to the base 21, and a receiving unit 4 that receives a predetermined operation from an operator.

The base 21 is a portion that supports the robot arm 20. The control device 8, which will be described later, is built in the base 21. An origin of a robot coordinate system is set at an optional portion of the base 21. The x axis, the y axis, and the z axis shown in FIG. 1 are axes of the robot coordinate system.

The robot arm 20 includes a first arm 22, a second arm 23, and a third arm 24 which is a work head. A coupling portion between the base 21 and the first arm 22, a coupling portion between the first arm 22 and the second arm 23, and a coupling portion between the second arm 23 and the third arm 24 are also referred to as joints.

The robot 2 is not limited to the illustrated configuration, and the number of the arms may be one or two, and may be four or more.

The robot 2 includes a drive unit 25 that rotates the first arm 22 with respect to the base 21, a drive unit 26 that rotates the second arm 23 with respect to the first arm 22, a u drive unit 27 that rotates a shaft 241 of the third arm 24 with respect to the second arm 23, and a z drive unit that moves the shaft 241 in the z-axis direction with respect to the second arm 23.

As shown in FIGS. 1 and 2, the drive unit 25 is built in a housing 220 of the first arm 22, and includes a motor 251 that generates a drive force, a brake 252, a reduction gear (not shown) that decelerates the drive force of the motor 251, and an encoder 253 that detects a rotation angle of a rotation axis of the motor 251 or the reduction gear.

The drive unit 26 is built in a housing 230 of the second arm 23, and includes a motor 261 that generates a drive force, a brake 262, a reduction gear (not shown) that decelerates the drive force of the motor 261, and an encoder 263 that detects a rotation angle of a rotation axis of the motor 261 or the reduction gear.

The u drive unit 27 is built in the housing 230 of the second arm 23, and includes a motor 271 that generates a drive force, a brake 272, a reduction gear (not shown) that decelerates the drive force of the motor 271, and an encoder 273 that detects a rotation angle of a rotation axis of the motor 271 or the reduction gear.

The z drive unit 28 is built in the housing 230 of the second arm 23, and includes a motor 281 that generates a drive force, a brake 282, a reduction gear (not shown) that decelerates the drive force of the motor 281, and an encoder 283 that detects a rotation angle of a rotation axis of the motor 281 or the reduction gear.

As the motor 251, the motor 261, the motor 271, and the motor 281, for example, a servo motor such as an AC servo motor or a DC servo motor can be used. As the reduction gear, for example, a planetary-gear reduction gear, a wave gear device, or the like can be used.

The brake 252, the brake 262, the brake 272, and the brake 282 have a function of decelerating the robot arm 20. Specifically, the brake 252 decelerates an operation speed of the first arm 22, the brake 262 decelerates an operation speed of the second arm 23, the brake 272 decelerates an operation speed of the third arm 24 in a u-axis direction, and the brake 282 decelerates an operation speed of the third arm 24 in the z-axis direction.

The control device 8 actuates the brake 252, the brake 262, the brake 272, and the brake 282 by changing an energization condition to decelerate each part of the robot arm 20. The brake 252, the brake 262, the brake 272, and the brake 282 are controlled by the control device 8 independently of the motor 251, the motor 261, the motor 271, and the motor 281.

Examples of the brake 252, the brake 262, the brake 272, and the brake 282 include an electromagnetic brake, a mechanical brake, a hydraulic brake, and a pneumatic brake, or the like.

As shown in FIG. 2, the encoder 253, the encoder 263, the encoder 273, and the encoder 283 are position detection units that detect a position of the robot arm 20. The encoder 253, the encoder 263, the encoder 273, and the encoder 283 are electrically coupled to the control device 8. The encoder 253, the encoder 263, the encoder 273, and the encoder 283 transmit information on the detected rotation angle to the control device 8 as an electrical signal. Accordingly, the control device 8 can control an actuation of the robot arm 20 based on the received information on the rotation angle.

The drive unit 25, the drive unit 26, the u drive unit 27, and the z drive unit 28 are coupled to a corresponding motor driver (not shown) respectively, and are controlled by the control device 8 via the motor driver.

The base 21 is fixed to, for example, a floor surface (not shown) with bolts or the like. The first arm 22 is coupled to an upper end portion of the base 21. The first arm is rotatable around a first axis O1 along the vertical direction with respect to the base 21. When the drive unit 25 that rotates the first arm 22 is driven, the first arm 22 rotates around the first axis O1 in a horizontal plane with respect to the base 21. A rotation amount of the first arm 22 with respect to the base 21 can be detected by the encoder 253.

The second arm 23 is coupled to a tip end portion of the first arm 22. The second arm 23 is rotatable around a second axis O2 along the vertical direction with respect to the first arm 22. An axial direction of the first axis O1 is the same as an axial direction of the second axis O2. That is, the second axis O2 is parallel to the first axis O1. When the drive unit 26 that rotates the second arm 23 is driven, the second arm 23 rotates around the second axis O2 in the horizontal plane with respect to the first arm 22. A drive amount of the second arm 23 with respect to the first arm 22, specifically, a rotation amount can be detected by the encoder 263.

The third arm 24 is installed and supported at a tip end portion of the second arm 23. The third arm 24 includes the shaft 241. The shaft 241 is rotatable around a third axis O3 along the vertical direction with respect to the second arm 23 and is movable in the upper-lower direction. The shaft 241 is the arm at the most tip end of the robot arm 20.

When the u drive unit 27 that rotates the shaft 241 is driven, the shaft 241 rotates around the z axis. A rotation amount of the shaft 241 with respect to the second arm 23 can be detected by the encoder 273.

When the z drive unit 28 that moves the shaft 241 in the z-axis direction is driven, the shaft 241 moves in the upper-lower direction, that is, in the z-axis direction. A movement amount of the shaft 241 in the z-axis direction with respect to the second arm 23 can be detected by the encoder 283.

In the robot 2, a tip end coordinate system in which a tip end of the shaft 241 is set as a control point TCP, and the control point TCP is set as an origin is set. The tip end coordinate system is calibrated with the robot coordinate system described above, and a position in the tip end coordinate system can be converted into the robot coordinate system. Accordingly, a position of the control point TCP can be specified in the robot coordinate system.

Various end effectors 7 are detachably coupled to a lower end portion of the shaft 241. In the illustrated configuration, the end effector 7 is a hand for gripping a workpiece. However, the end effector is not limited to the configuration, and may be, for example, a hand for gripping the workpiece by absorption or suction, a tool such as a driver or a wrench, or a coating tool such as a spray.

In the present embodiment, although the end effector 7 is not a component of the robot 2, a part or all of the end effector 7 may be a component of the robot 2.

As shown in FIG. 1, the force detection unit 5 detects a force applied to the robot 2, that is, a force applied to the robot arm 20 and the base 21. In the present embodiment, the force detection unit 5 is provided below the base 21, that is, on a −z axis side, and supports the base 21 from below.

An installation position of the force detection unit 5 is not limited to the above, and may be, for example, the lower end portion of the shaft 241 or each joint portion.

The force detection unit 5 is constituted by, for example, a piezoelectric body such as a crystal, and can include a plurality of elements that output charges when an external force is received. The control device 8 can convert an amount of the charge into a value related to the external force received by the robot arm 20. In addition, with such a piezoelectric body, an orientation in which the charges can be generated when the external force is received can be adjusted according to an installation orientation.

The receiving unit 4 is a part that receives the predetermined operation of the operator. The receiving unit 4 includes a teaching button (not shown). The teaching button can be used for direct teaching. The teaching button may be a mechanical button or a touch-type electric button. Other buttons having different functions may be installed around the teaching button.

Next, the teaching device 3 will be described.

As shown in FIG. 2, the teaching device 3 has a function of designating the operation program to the robot 2. Specifically, the teaching device 3 inputs the position and a posture of the robot arm 20 to the control device 8.

As shown in FIG. 2, the teaching device 3 includes a central processing unit (CPU) 31, a storage unit 32, a communication unit 33, and a display unit 34. The teaching device 3 is not particularly limited, and examples thereof include a tablet, a personal computer, a smartphone, and the like.

The CPU 31 reads and executes various programs and the like stored in the storage unit 32. A signal generated by the CPU 31 is transmitted to the control device 8 of the robot 2 via the communication unit 33. Accordingly, the robot arm 20 can perform a predetermined work under a predetermined condition.

The storage unit 32 stores the various programs and the like executable by the CPU 31. Examples of the storage unit 32 include a volatile memory such as a random access memory (RAM), a nonvolatile memory such as a read only memory (ROM), and a detachable external storage device.

The communication unit 33 transmits and receives a signal to and from the control device 8 by using, for example, an external interface such as a wired local area network (LAN) or a wireless LAN.

The display unit 34 is constituted by various displays. In the present embodiment, as an example, a touch panel type display unit, that is, a configuration in which the display unit 34 has a display function and an input operation function will be described.

However, the display unit is not limited to such a configuration, and may separately include an input operation unit. In this case, examples of the input operation unit include a mouse, a keyboard, and the like. In addition, the display unit may be a configuration in which a touch panel, the mouse, the keyboard, and the like are used in combination.

Next, the control device 8 will be described.

As shown in FIG. 1, the control device 8 is built in the base 21 in the present embodiment. As shown in FIG. 2, the control device 8 has a function of controlling driving of the robot 2, and is electrically coupled to each unit of the robot 2 described above. The control device 8 is not limited thereto, and may be configured separately from the robot 2.

When the robot arm 20 is temporarily stopped during the work or stopped after finishing the work, a vibration is generated in the robot arm 20. Since the vibration affects work accuracy and work time, it is preferable to reduce the vibration as much as possible. More specifically, it is preferable that a time until the vibration is damped is as short as possible. Hereinafter, shortening the time until the vibration is damped is referred to as "reducing the vibration".

In order to reduce the vibration, in the robot system 100, a specific frequency component is removed from a drive signal for driving the motor 251, the motor 261, the motor 271, and the motor 281 to generate a correction drive signal.

A strength of the vibration is determined by various conditions such as a weight of the end effector 7, the posture of the robot arm 20 when the robot arm 20 is stopped, the position of the control point TCP, a path followed so far, a speed and an acceleration in the path, and the like.

In order to determine which frequency component is removed from the drive signal to generate the correction drive signal, it is preferable to take these conditions into consideration. Among these, since height information on a height of a tip end of the robot arm 20 during an operation of the robot arm 20 or during a stop of the robot arm 20 tends to particularly affect vibration reduction, the correction drive signal is generated based on the height information in the present disclosure. In the present embodiment, the height of the tip end of the robot arm 20 means a z-axis coordinate of the control point TCP set in the robot arm 20 in the robot coordinate system. This will be described in detail below.

As shown in FIG. 3, the control device 8 executes the method for controlling a robot according to the present disclosure, and includes a motion processing unit 8A, a servo processing unit 8B, a storage unit 8C, and a communication unit 8D. The motion processing unit 8A and the servo processing unit 8B are each constituted by at least one processor.

The storage unit 8C stores various programs executable by the motion processing unit 8A and the servo processing unit 8B, various programs such as the program for controlling a robot according to the present disclosure, tables described later, and the like. Examples of the storage unit 8C include a volatile memory such as a random access memory (RAM), a nonvolatile memory such as a read only memory (ROM), and a detachable external storage device. The communication unit 8D enables signals to be transmitted and received between each unit of the robot 2 and the teaching device 3 by using, for example, an external interface such as a wired local area network (LAN) or a wireless LAN.

The motion processing unit 8A includes a position command generation unit 81 and an adjustment unit 82.

The position command generation unit 81 generates a position command signal indicating a target position to be positioned by the end effector 7, and a speed and an acceleration to the target position based on an operation program input by a user. The user can input the operation program by using an input device such as the teaching device 3.

The adjustment unit 82 determines a frequency component to be removed by a filter processing unit 85 based on information input by the user. This will be described later.

The servo processing unit 8B includes a position control unit 83, a speed control unit 84, the filter processing unit 85, and a current control unit 86.

The position control unit 83 receives information on the target position, and the speed and the acceleration to the target position generated by the position command generation unit 81, and generates and outputs speed control signals of the motor 251, the motor 261, the motor 271, and the motor 281 based on the information and a detection result of the force detection unit 5.

The speed control unit 84 receives the speed control signal from the position control unit 83. The speed control unit 84 generates a torque control signal (hereinafter, also referred to as the "drive signal") based on the speed control signal received from the position control unit 83 and detection results of the encoder 253, the encoder 263, the encoder 273, and the encoder 283, and outputs the torque control signal to the filter processing unit 85.

The filter processing unit 85 generates a new torque control signal (hereinafter, also referred to as the "correction drive signal") by removing the specific frequency component from the torque control signal received from the speed control unit 84 by using a band removing filter, and outputs the new torque control signal to the current control unit 86. In this specification, "removing" includes not only setting the specific frequency component to 0 but also reducing the specific frequency component. The filter processing unit 85 determines a coefficient used in the band removing filter, that is, the frequency component to be removed by using the band removing filter, based on a signal output by the adjustment unit 82.

The current control unit 86 receives the torque control signal from the filter processing unit 85, and receives a feedback signal indicating an amount of current supplied to the motor 251, the motor 261, the motor 271, and the motor 281 from a servo amplifier (not shown). The current control unit 86 determines the amount of current to be supplied to the motor 251, the motor 261, the motor 271, and the motor 281 based on the torque control signal received from the filter processing unit 85 and the feedback signal received from the servo amplifier (not shown), and drives the motor 251, the motor 261, the motor 271, and the motor 281.

In the robot system 100, the user can input the height information. For example, the user can acquire information on a trajectory through which the control point TCP passes by inputting information on the operation path by using the teaching device 3. The height information will be described as a height when the control point TCP is positioned at a final target position.

For example, the time until the vibration is damped differs between a case where the height of the control point TCP at the time of stopping is at a position as shown in FIG. 8 and a case where the height of the control point TCP at the time of stopping is at a position as shown in FIG. 9. In general, the lower the height of the control point TCP is, the longer the time until the vibration is damped is. In the illustrated configuration, the time until the vibration is damped tends to be longer at a height C2 than at a height C1.

Therefore, the vibration can be reduced by generating the correction drive signal in consideration of the height of the control point TCP in a predetermined posture of the robot arm 20, that is, a position in the z-axis direction. Specifically, the adjustment unit 82 determines a frequency component to be removed from the drive signal for driving the motor 251, the motor 261, the motor 271, and the motor 281 based on the height information. Specifically, the adjustment unit 82 determines the frequency component to be removed with reference to a table T1 shown in FIG. 4. The table T1 indicates a relationship between the height information and the frequency component, and is experimentally obtained in advance. The frequency component to be removed may be determined based on a calibration curve indicating the relationship between the height information and the frequency component instead of the table T1.

As shown in FIG. 4, for example, when the height information is C1, the frequency component to be removed is F1. The adjustment unit 82 outputs a signal corresponding to F1 to the filter processing unit 85. The correction drive signal can be obtained through the processing described above. By driving the motor 251, the motor 261, the motor 271, and the motor 281 with such a correction drive signal, a resonance of the robot arm 20, the end effector 7, and the like can be reduced by the removed frequency component, and the time until the vibration is damped can be shortened.

Next, a case where the robot arm 20 performs an operation as shown in FIG. 12 will be described. FIG. 12 illustrates the trajectory of the control point TCP. The operation shown FIG. 12 is an operation in which a lifting operation is performed, a horizontal operation is performed, and a lowering operation is performed. The lifting operation is performed from a lifting operation start position P1 to a lifting operation end position P2. The horizontal operation is performed from the lifting operation end position P2 to a lowering operation start position P3. The lowering operation is performed from the lowering operation start position P3 to a lowering operation end position P4.

Although the configuration in which the frequency component to be removed is determined based on the height of the control point TCP at the lowering operation end position P4 has been described above, it may be better to determine the frequency component to be removed based on the height of the control point TCP at the lifting operation start position P1 or the lowering operation start position P3 depending on various conditions in order to reduce the vibration in the horizontal direction. Specifically, when none of the following conditions 1, 2, and 3 is satisfied, the frequency component to be removed is determined based on the height of the control point TCP at the lifting operation start position P1.

When at least one of the following conditions 1, 2, and 3 is satisfied, the frequency component to be removed is determined based on the height of the control point TCP at the lowering operation start position P3, and when none of the following conditions 1, 2, and 3 is satisfied, the frequency component to be removed is determined based on the height of the control point TCP at the lifting operation start position P1.

Condition 1: A distance between the lowering operation start position P3 and the lowering operation end position P4 at which the lowering operation is ended is equal to or greater than a predetermined distance.

Condition 2: A height of the lowering operation start position P3 is equal to or higher than a predetermined height.

Condition 3: A height of the lowering operation end position P4 at which the lowering operation is ended is equal to or higher than a predetermined height.

The condition 1 is a definition relating to a distance for performing the lowering operation. When the distance for performing the lowering operation is relatively long, it is preferable to determine the frequency component to be removed based on the height of the control point TCP at the lowering operation start position P3. Accordingly, a drive signal capable of reducing the vibration of a horizontal component can be generated.

The condition 2 is a definition relating to the height of the lowering operation start position P3. When the height of the lowering operation start position P3 is relatively high, it is preferable to determine the frequency component to be removed based on the height of the control point TCP at the lowering operation start position P3. Accordingly, a drive signal capable of reducing the vibration of a horizontal component can be generated.

The condition 3 is a definition relating to the height of the lowering operation end position P4. When the height of the lowering operation end position P4 is relatively high, it is preferable to determine the frequency component to be removed based on the height of the control point TCP at the lowering operation start position P3. Accordingly, a drive signal capable of reducing the vibration of a horizontal component can be generated.

In this way, by selecting a reference position for determining the frequency component to be removed according to the condition of the operation, the vibration can be reduced more effectively. The "Selecting" includes both a case where the control device 3 performs selection based on a determination criterion and a case where an instruction selected and input by the user is accepted.

When the frequency component to be removed is F0, F0 can be expressed by the following equation (1).

$$F0 = K1 \times W \times Ew \times J^2 + K2 \times Ez \times Z \times J + K0 \times W \times Z \quad (1)$$

K1, K2, and K0 in the equation (1) are coefficients unique to the robot and can be calculated from actual measurement values. J in the equation (1) indicates the rotation angle of the second arm 23 with respect to the first arm 22. W in the equation (1) indicates weight information. Z in the equation (1) indicates the position of the control point TCP in the z-axis direction. Ew in the equation (1) indicates a total weight of the end effector 7 and the workpiece. Ez in the equation (1) indicates a position of a gravity center obtained by combining the end effector 7 with the workpiece.

Therefore, in addition to the height information, it is preferable to generate the correction drive signal in consideration of at least one of these factors.

In the robot system 100, the user can input information on the weight of the end effector 7 and a weight of the workpiece via the teaching device 3. For example, the user may directly input the weight of the end effector 7 and the weight of the workpiece, or the adjustment unit 82 may specify the weight of the end effector 7 based on a table indicating a relationship between an input result and the weight of the end effector 7 by inputting a type of the end effector 7. The weight of the workpiece may also be specified by using a table in the same manner. The adjustment unit 82 determines the frequency component to be removed from the drive signal in consideration of information (hereinafter, referred to as the "weight information") on the weight of the end effector 7 and the weight of the workpiece.

For example, the time until the vibration is damped differs between a case where the weight of the end effector 7 and the weight of the workpiece are relatively heavy W1 and a case where the weight of the end effector 7 and the weight of the workpiece are relatively heavy W2. In general, the heavier the weight of the end effector 7 and the weight of the workpiece, the longer the time until the vibration is damped. In consideration of this, as shown in FIG. 5, by preparing the table T1 described above for each weight information and generating the correction drive signal by referring to any one of these tables according to the weight information, the correction drive signal with higher accuracy of the vibration reduction can be generated.

When the end effector 7 does not grip the workpiece, the weight of the workpiece is 0, and the weight information is only the weight of the end effector 7.

It is preferable to generate the correction drive signal in consideration of a positional relationship between a gravity center G1 of the robot arm 20 in the predetermined posture and a gravity center G2 of the end effector 7. The predetermined posture in the present embodiment refers to a posture in which the control point TCP is stopped or temporarily stopped at the target position. The time until the vibration is damped differs between a case where the positional relationship between the gravity center G1 and the gravity center G2 at the time of stopping is a positional relationship A1 as shown in FIG. 8 and a case where the positional relationship between the gravity center G1 and the gravity center G2 at the time of stopping is a positional relationship A2 as shown in FIG. 9. This is because the natural vibration characteristics of the entire robot 2 change depending on a distance between the gravity center G1 and the gravity center G2 and a direction in which the gravity center G1 and the gravity center G2 deviate.

In consideration of this, as shown in FIG. 6, by preparing the table T1 described above for each positional relationship between the gravity center G1 and the gravity center G2 and generating the correction drive signal by referring to any one of these tables according to the positional relationship, the correction drive signal with higher accuracy of the vibration reduction can be generated.

It is preferable to generate the correction drive signal in consideration of an overall shape of the robot arm in the predetermined posture of the robot arm 20. The overall shape of the robot arm 20 is determined based on rotation positions of the motor 251, the motor 261, the motor 271, and the motor 281. In particular, in the SCARA robot, the rotation angle of the motor 261, that is, an angle formed by the first arm 22 and the second arm 23 has a large influence on vibration characteristics. Information on the overall shape of the robot arm 20 is included in the information of the operation path input by the user. Therefore, when the user inputs the information on the operation path, the control device 8 can grasp the posture stopped or temporarily stopped at the target position.

The time until the vibration is damped differs between a case where the overall shape of the robot arm 20 at the time of stopping is a shape B1 as shown in FIG. 10 and a case where the overall shape of the robot arm 20 at the time of stopping is a shape B2 as shown in FIG. 11. This is mainly because the natural vibration characteristics of the entire robot 2 change according to a distance between the position of the control point TCP and a root of the robot arm 20.

In consideration of this, as shown in FIG. 7, by preparing the tables T1 described above for each overall shape of the robot arm 20, in particular, for each angle formed by the first arm 22 and the second arm 23 and generating the correction drive signal by referring to one of these tables, the correction drive signal with higher accuracy of the vibration reduction can be generated. In particular, such control is effective when applied to a vertical articulated robot such as a six-axis robot.

The correction drive signal may be generated by combining these elements. A multidimensional table indicating a relationship between the elements may be prepared.

Next, an example of the method for controlling a robot according to the present disclosure will be described with reference to a flowchart shown in FIG. 13.

First, in step S101, the height information is acquired. As described above, this step is performed by inputting various information such as the height information by using the teaching device 3 by the user and acquiring the information by the control device 8. Step S101 is a first step.

Next, in step S102, the frequency component to be removed from the drive signal for driving the motor 251, the motor 261, the motor 271, and the motor 281 is determined based on the various information such as the height information acquired in step S101. This step is executed by the adjustment unit 82. As described above, the step is executed by appropriately selecting a table according to the information input in step S101 and referring to the selected table. Step S102 is a second step.

Next, in step S103, the frequency component determined in step S102 is removed from the drive signal to generate the correction drive signal. The step is executed by the filter processing unit 85 as described above. Step S103 is a third step.

Next, in step S104, the motor 251, the motor 261, the motor 271, and the motor 281 are driven based on the correction drive signal generated in step S103. Accordingly, the vibration at the time of stopping or temporarily stopping can be reduced, and the work can be performed accurately and quickly. Step S104 is a fourth step.

As described above, the method for controlling a robot according to the present disclosure is a method for controlling the robot 2 including the base 21, the robot arm 20 coupled to the base 21, and the drive unit 25, the drive unit 26, the u drive unit 27, and the z drive unit 28 including the motor 251, the motor 261, the motor 271, and the motor 281 respectively, which drive the robot arm 20. The method for controlling a robot according to the present disclosure includes the first step of acquiring the height information on the height of the tip end of the robot arm 20, that is, the height of the control point TCP during the operation of the robot arm 20 or during the stop of the robot arm 20, the second step of determining the frequency component to be removed from the drive signal for driving the motor 251, the motor 261, the motor 271, and the motor 281 based on the height information acquired in the first step, and the third step of removing the frequency component determined in the second step from the drive signal to generate the correction drive signal. By driving the robot 2 with such a correction drive signal, the vibration at the time of stopping or temporarily stopping can be reduced, and the work can be performed accurately and quickly. In particular, a process of tapping the robot arm with a hammer to acquire information on the vibration characteristics as in the related art can be omitted, and the vibration can be reduced by a simple method.

In the present embodiment, various information may be input by using an input device other than the teaching device 3.

In the second step, the frequency component is determined based on a calibration curve or a table indicating the relationship between the frequency component and the height information. Accordingly, the frequency component to be removed can be determined by simple processing.

The robot arm 20 executes the lifting operation in which the tip end of the robot arm 20 is lifted from the lifting operation start position P1 and the lowering operation in which the tip end of the robot arm 20 is lowered from the lowering operation start position P3 after the lifting operation. The determination of the frequency component in the second step is performed based on the height of the tip end of the robot arm at any one of the operation start position P1 and the lowering operation start position P3, that is, the height of the control point TCP. Accordingly, a drive signal capable of reducing the vibration of a horizontal component can be generated.

The determination of the frequency component in the second step is performed based on the height of the tip end of the robot arm 20 at the lowering operation start position P3, that is, the height of the control point TCP when at least one of the following conditions 1, 2, and 3 is satisfied, and is performed based on the height of the control point TCP at the lifting operation start position P1 when none of the following conditions 1, 2, and 3 is satisfied. Condition 1: A distance between the lowering operation start position and the lowering operation end position at which the lowering operation is ended is equal to or greater than a predetermined distance. Condition 2: A height of the lowering operation start position is equal to or higher than a predetermined height. Condition 3: A height of the lowering operation end position at which the lowering operation is ended is equal to or higher than a predetermined height. Accordingly, the drive signal capable of reducing the vibration of a horizontal component can be generated.

The determination of the frequency component in the second step is performed further based on the weight information including information on the weight of the end effector 7 installed on the robot arm 20 and a weight of an object to be worked by the end effector 7. Accordingly, the correction drive signal with higher accuracy of the vibration reduction can be generated.

The robot 2 is a SCARA robot, and the robot arm 20 includes the first arm 22 coupled to the base 21, the second arm 23 coupled to the first arm 22, and the third arm 24 coupled to the second arm 23. The determination of the frequency component in the second step is performed further based on the angle formed by the first arm 22 and the second arm 23 in the predetermined posture of the robot arm 20. Accordingly, the correction drive signal with higher accuracy of the vibration reduction can be generated.

In the third step, the frequency component determined in the second step is removed from the drive signal by using the band removing filter to generate the correction drive signal. Accordingly, the correction drive signal can be generated by simple processing.

The method for controlling a robot according to the present disclosure includes the fourth step of driving the drive unit 25, the drive unit 26, the u drive unit 27, and the z drive unit 28 based on the correction drive signal. Accordingly, the vibration at the time of stopping or temporarily stopping can be reduced, and the work can be performed accurately and quickly.

The non-transitory computer-readable storage medium storing a program for controlling a robot according to the present disclosure is a non-transitory computer-readable storage medium storing a program for controlling the robot 2 including the robot arm 20, and the drive unit 25, the drive unit 26, the u drive unit 27, and the z drive unit 28 including the motor 251, the motor 261, the motor 271, and the motor 281 respectively, which drive the robot arm 20. The non-transitory computer-readable storage medium storing a program for controlling a robot according to the present disclosure causes the robot to execute the first step of acquiring the height information on the height of the tip end of the robot arm 20, that is, the height of the control point TCP during the operation of the robot arm 20 or during the stop of the robot arm 20, the second step of determining the frequency component to be removed from the drive signal for driving the motor 251, the motor 261, the motor 271, and the motor 281 based on the height information acquired in the first step, and the third step of removing the frequency component determined in the second step from the drive signal to generate the correction drive signal. By driving the robot 2 with the correction drive signal obtained by executing such a program for controlling a robot, the vibration at the time of stopping or temporarily stopping can be reduced, and the work can be performed accurately and quickly. In particular, the process of tapping the robot arm 20 with a hammer to acquire the information on the vibration characteristics as in the related art can be omitted, and the vibration can be reduced by a simple method.

The non-transitory computer-readable storage medium storing a program for controlling a robot according to the present disclosure may be stored in the storage unit 32, may be stored in the storage unit 8C, may be stored in a recording medium such as a CD-ROM, or may be stored in a storage device that can be coupled via a network or the like.

The robot system according to the present disclosure includes the robot arm 20, and the drive unit 25, the drive unit 26, the u drive unit 27, and the z drive unit 28 including the motor 251, the motor 261, the motor 271, and the motor 281 respectively, which drive the robot arm 20, and the control device 8 that is a control unit that controls the actuation of the robot arm 20. The control device 8 includes the communication unit 8D that is an acquisition unit that acquires the height information on the tip end of the robot arm 20, that is, the height of the control point TCP during the operation of the robot arm 20 or during the stop of the robot arm 20, and the adjustment unit 82 and the filter processing unit 85, which are correction signal generation units that determine the frequency component to be removed from the drive signal based on the height information acquired from the communication unit 8D and remove the determined frequency component from the drive signal to generate the correction drive signal. By driving the robot 2 with such a correction drive signal, the vibration at the time of stopping or temporarily stopping can be reduced, and the work can be performed accurately and quickly. In particular, the process of tapping the robot arm 20 with a hammer to acquire the information on the vibration characteristics as in the related art can be omitted, and the vibration can be reduced by a simple method.

Although the method for controlling a robot, the robot system, and the non-transitory computer-readable storage medium storing a program for controlling a robot according to the present disclosure have been described above based on the illustrated embodiment, the present disclosure is not limited thereto. A configuration of each unit can be replaced with any configuration having a similar function. In addition, any other components and processes may be added to the method for controlling a robot, the robot system, and the non-transitory computer-readable storage medium storing a program for controlling a robot.

In the embodiment described above, although the configuration in which the control device 8 generates the correction drive signal has been described, the present disclosure is not limited thereto, and the teaching device 3 may generate the correction drive signal. That is, the "control unit" may be regarded as the control device 8 or may be regarded as a control unit built in the teaching device 3.

What is claimed is:

1. A method for controlling a robot including a base, a robot arm coupled to the base, and a drive unit including a motor for driving the robot arm, the method comprising:
   a first step of acquiring height information on a height of a tip end of the robot arm at a lowering operation start position from which the tip end of the robot arm is lowered;
   a second step of determining a frequency component to be removed from a drive signal for driving the motor based on the height information acquired in the first step; and
   a third step of removing the frequency component determined in the second step from the drive signal to generate a correction drive signal,
   wherein an end effector is attached to the robot arm,
   the tip end of the robot arm is a control point on the end effector,
   the robot arm is configured to execute a lifting operation in which the tip end of the robot arm is lifted from an operation start position and a lowering operation in which the tip end of the robot arm is lowered from the lowering operation start position after the lifting operation,
   the determination of the frequency component in the second step is performed based on a height of the tip end of the robot arm at a position which is obtained by selecting one of the operation start position and the lowering operation start position,
   in the second step, when at least one of the following conditions 1, 2, and 3 is satisfied, the frequency component is determined based on the height of the tip end of the robot arm at the lowering operation start position, and when none of the following conditions 1, 2, and 3 is satisfied, the frequency component is determined based on the height of the tip end of the robot arm at the operation start position, condition 1: a distance between the lowering operation start position and a lowering operation end position at which the lowering operation is ended is equal to or greater than a predetermined distance, condition 2: a height of the lowering operation start position is equal to or higher than a predetermined height, and condition 3: the height of the lowering operation end position is equal to or higher than the predetermined height.

2. The method for controlling a robot according to claim 1, wherein
in the second step, the frequency component is determined based on a calibration curve or a table indicating a relationship between the frequency component and the height information.

3. The method for controlling a robot according to claim 1, wherein
the determination of the frequency component in the second step is performed further based on weight information including information on a weight of the end effector installed on the robot arm and a weight of an object to be worked by the end effector.

4. The method for controlling a robot according to claim 1, wherein
the robot is a SCARA robot,
the robot arm includes a first arm, a second arm coupled to the first arm, and a third arm coupled to the second arm, and
the determination of the frequency component in the second step is performed further based on an angle formed by the first arm and the second arm in a predetermined posture of the robot arm.

5. The method for controlling a robot according to claim 1, wherein
in the third step, the frequency component determined in the second step is removed from the drive signal by using a band removing filter to generate the correction drive signal.

6. The method for controlling a robot according to claim 1, further comprising:
a fourth step of driving the drive unit based on the correction drive signal.

7. A robot system, comprising:
a robot arm;
an end effector attached to the robot arm;
a drive unit including a motor for driving the robot arm; and
a processor configured to execute a program stored in a memory so as to:
control an actuation of the robot arm;
acquire height information on a height of a tip end of the robot arm at a lowering operation start position from which the tip end of the robot arm is lowered;
determine a frequency component to be removed from a drive signal based on the height information; and
remove the determined frequency component from the drive signal to generate a correction drive signal,
wherein the tip end of the robot arm is a control point on the end effector,
the robot arm is configured to execute a lifting operation in which the tip end of the robot arm is lifted from an operation start position and a lowering operation in which the tip end of the robot arm is lowered from the lowering operation start position after the lifting operation,
the determination of the frequency component is performed based on a height of the tip end of the robot arm at a position which is obtained by selecting one of the operation start position and the lowering operation start position,
when at least one of the following conditions 1, 2, and 3 is satisfied, the frequency component is determined based on the height of the tip end of the robot arm at the lowering operation start position, and when none of the following conditions 1, 2, and 3 is satisfied, the frequency component is determined based on the height of the tip end of the robot arm at the operation start position,
condition 1: a distance between the lowering operation start position and a lowering operation end position at which the lowering operation is ended is equal to or greater than a predetermined distance,
condition 2: a height of the lowering operation start position is equal to or higher than a predetermined height, and
condition 3: the height of the lowering operation end position is equal to or higher than the predetermined height.

8. A non-transitory computer-readable storage medium storing a program for controlling a robot including a robot arm, an end effector attached to the robot arm, and a drive unit including a motor for driving the robot arm, the program causing a processor to perform the steps of:
a first step of acquiring height information on a height of a tip end of the robot arm at a lowering operation start position from which the tip end of the robot arm is lowered;
a second step of determining a frequency component to be removed from a drive signal for driving the motor based on the height information acquired in the first step; and
a third step of removing the frequency component determined in the second step from the drive signal to generate a correction drive signal,
wherein the tip end of the robot arm is a control point on the end effector,
the robot arm is configured to execute a lifting operation in which the tip end of the robot arm is lifted from an operation start position and a lowering operation in which the tip end of the robot arm is lowered from the lowering operation start position after the lifting operation,
the determination of the frequency component in the second step is performed based on a height of the tip end of the robot arm at a position which is obtained by selecting one of the operation start position and the lowering operation start position,
in the second step, when at least one of the following conditions 1, 2, and 3 is satisfied, the frequency component is determined based on the height of the tip end of the robot arm at the lowering operation start position, and when none of the following conditions 1, 2, and 3 is satisfied, the frequency component is determined based on the height of the tip end of the robot arm at the operation start position,
condition 1: a distance between the lowering operation start position and a lowering operation end position at which the lowering operation is ended is equal to or greater than a predetermined distance, condition 2: a height of the lowering operation start position is equal to or higher than a predetermined height, and condition 3: the height of the lowering operation end position is equal to or higher than the predetermined height.

\* \* \* \* \*